(12) United States Patent
Schmitt et al.

(10) Patent No.: US 11,339,891 B2
(45) Date of Patent: May 24, 2022

(54) RETAINING RING FOR A FLOW CONTROL DEVICE

(71) Applicant: FISHER CONTROLS INTERNATIONAL LLC, Marshalltown, IA (US)

(72) Inventors: Lucas J. Schmitt, Marshalltown, IA (US); Steven K. Hostetter, Colfax, IA (US); Daniel M. Adams, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 16/901,898

(22) Filed: Jun. 15, 2020

(65) Prior Publication Data
US 2021/0388915 A1 Dec. 16, 2021

(51) Int. Cl.
*F16K 27/08* (2006.01)
*B33Y 80/00* (2015.01)

(52) U.S. Cl.
CPC ............... *F16K 27/08* (2013.01); *B33Y 80/00* (2014.12)

(58) Field of Classification Search
CPC .................. F16K 27/08; B33Y 89/00
See application file for complete search history.

(56) References Cited

U.S. PATENT DOCUMENTS

| 8,714,560 | B2 * | 5/2014 | Faas | F16J 15/3236 |
| | | | | 277/530 |
| 2016/0076653 | A1 * | 3/2016 | Bell | F16K 3/246 |
| | | | | 251/359 |
| 2020/0355289 | A1 * | 11/2020 | Hostetter et al. | F16K 27/041 |

OTHER PUBLICATIONS

U.S. Appl. No. 16/405,531, Control Valves Including Valve Trim Having Relative Movement Between the Bonnet and the Cage, filed May 8, 2019.

* cited by examiner

*Primary Examiner* — Kevin L Lee
(74) *Attorney, Agent, or Firm* — Marshall, Gerstein & Borun LLP

(57) ABSTRACT

A flow control device includes a valve body having an inlet, an outlet, and a flow path connecting the inlet and the outlet. A cage is disposed in the flow path, and a bonnet is coupled to the cage and includes a portion overlapping with a portion of the cage. A retaining ring is disposed between the cage and the bonnet. The retaining ring includes an interior side, an exterior side, and a cavity formed between the interior and exterior sides.

20 Claims, 6 Drawing Sheets

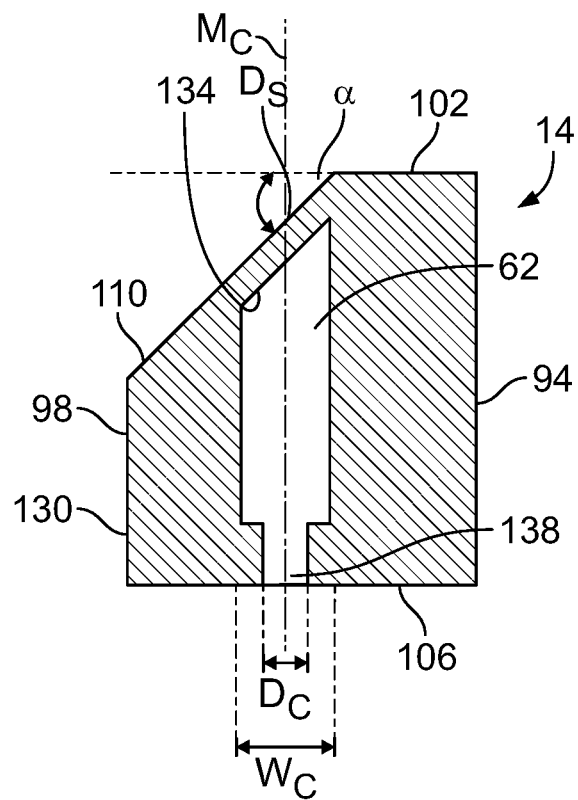
A-A  FIG. 5
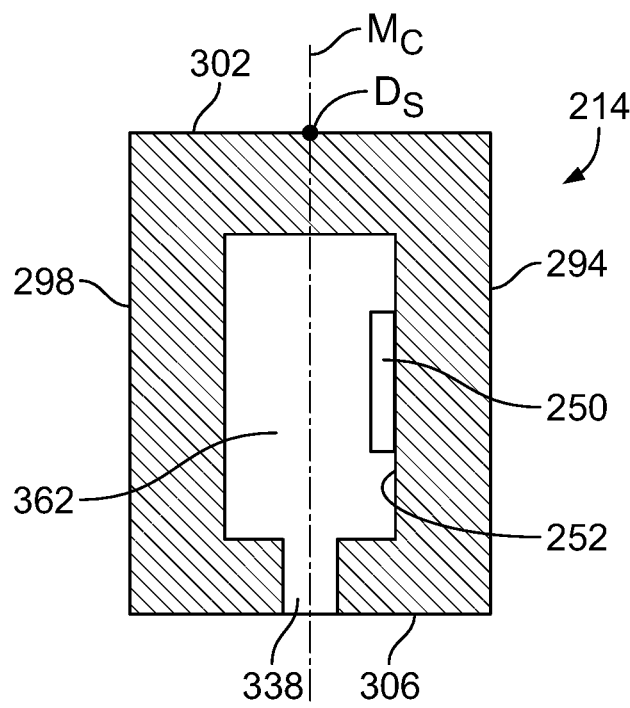
FIG. 6

RETAINING RING FOR A FLOW CONTROL DEVICE

FIELD OF DISCLOSURE

The present disclosure relates to a flow control device, and in particular, a retaining ring for a flow control device.

BACKGROUND

Control valves are commonly used in process plants to control the flow of a fluid (e.g., a gas, a liquid, etc.) or any other substance through pipes and/or vessels to which they are connected. A control valve is typically composed of one or more inlets and outlets, and includes a flow control element or member (e.g., a valve gate, a piston, a cage, a valve plug, a control member, etc.) that operates to control fluid flow through apertures that fluidly couple the inlet(s) to the outlet(s). A control member is typically coupled to a valve bonnet that is mechanically coupled (e.g., bolted, clamped, threaded into, etc.) to the valve body. Typically, the control member is configured to engage a sealing structure (e.g., a valve seat) that encompasses a flow path through the valve. A regulator is a self-controlling form of a control valve.

To couple a bonnet to valve body, the bonnet is clamped to the valve body using a plurality of fasteners. In one example, the bonnet may also be coupled to a valve trim of the control valve using a retaining ring. The retaining ring may be disposed between the bonnet and a cage of the control valve such that the bonnet is secured to the valve trim and seals against the surface of the cage. In some cases, the retaining ring is inaccessible and cannot be manipulated, requiring the ring to be broken to disassemble the bonnet from the cage. However, the amount of force required to break the retaining ring may inadvertently transfer to other valve components, such as the valve stem, which may be damaged during disassembly. To reduce risk of damage to the control valve, the retaining ring may be altered so that the height or width is smaller to reduce shear area, thereby requiring less shear force to break the ring for disassembly. However, with reduced dimensions to the retaining ring, the coupling between the bonnet and the cage of the valve body may be slack, causing undesirable movement and misalignment between the bonnet and the cage.

SUMMARY

The exemplary retaining rings described herein may substantially reduce the amount of force required to disassemble a control valve while maintaining mating engagements between the cage, the bonnet, and the retaining ring. In accordance with a first exemplary aspect, a flow control valve may include a valve body having an inlet, an outlet, and a flow path connecting the inlet and the outlet. A cage may be disposed in the flow path, and a bonnet may be coupled to the cage. The bonnet may include a portion overlapping with a portion of the cage. A retaining ring may be disposed between the cage and the bonnet. The retaining ring includes an interior side, an exterior side, and a cavity formed between the interior and exterior sides.

In accordance with a second exemplary aspect, a retaining ring assembly may include a first valve component with an annular projection. The annular projection may have an interior surface and a groove formed in the interior surface. The assembly may further include a second valve component having a cylindrical wall with an exterior surface and a groove formed in the exterior surface. The cylindrical wall of the second valve component may overlap with the annular projection of the first valve component when the first and second valve components are coupled. A retaining ring may be disposed between the groove of the first valve component and the groove of the second valve component. The retaining ring may include an interior side, an exterior side, first and second parallel sides extending between the interior and exterior sides, and a cavity disposed between the first and second parallel sides and between the interior and exterior sides.

In accordance with a third exemplary aspect, a method of manufacturing a retaining ring using additive manufacturing may include forming a retaining ring having an interior side, exterior side defining an outer diameter, and first and second parallel sides extending between the interior and exterior sides. The exterior side may include an angled surface such that the outer diameter of the retaining ring decreases in an axial direction to at least one of the first and second parallel sides. The method may include forming a cavity disposed between the interior side, exterior side, and the first and second parallel sides. Forming the ring may include depositing a solidifiable material in multiple layers to form a three-dimensional retaining ring with an interior cavity.

In accordance with a fourth exemplary aspect, a method of retaining a bonnet to a valve cage using a retaining ring may include providing a retaining ring having an interior side defining an inner diameter, exterior side defining an outer diameter, and first and second parallel sides extending between the interior and exterior sides. The exterior side may include an angled surface such that the outer diameter of the retaining ring decreases in an axial direction to at least one of the first and second parallel sides. The method may include providing a cage having an outer wall and a groove formed in the outer wall, and providing a bonnet having an annular portion with an interior surface and a groove formed in the interior surface of the annular portion. The groove may be formed adjacent to an end of the annular portion. The method may include coupling the retaining ring to the groove of the cage, and coupling the cage to the bonnet by engaging the end of the annular portion of the bonnet with the angled surface of the retaining ring, thereby compressing the retaining ring further into the groove of the cage until the groove of the bonnet is adjacent to the groove of the cage.

In further accordance with any one or more of the foregoing first, second, and third exemplary aspects, a flow control device, a retaining assembly, a method of manufacturing a retaining ring, and/or a method of retaining a bonnet to a cage may include any one or more of the following forms.

In a preferred form, the exterior side of the retaining ring may have an angled surface that at least partially extends into an interior groove of the bonnet.

In a preferred form, a cross-section of the cavity may have an angled side.

In a preferred form, the angled side may be substantially parallel with the angled surface of the exterior side of the retaining ring.

In a preferred form, the bonnet may include an interior groove and the cage may include an exterior groove.

In a preferred form, the retaining ring may be disposed between the interior groove and the exterior groove.

In a preferred form, the retaining ring may include first and second parallel sides extending between the interior and exterior sides.

In a preferred form, the first and second parallel sides may mate with first and second parallel surfaces of the exterior groove of the cage.

In a preferred form, the cavity may have a trapezoidal cross-sectional area.

In a preferred form, a portion of the exterior side of the retaining ring may be parallel with a portion of the interior side of the retaining ring.

In a preferred form, a sensor may be disposed in the cavity of the retaining ring.

In a preferred form, the exterior side of the retaining ring may have a chamfered surface that is adapted to engage a portion of the first valve component when the second valve component overlaps with the first valve component to couple the first and second valve components.

In a preferred form, the cavity may include an angled surface substantially parallel to the chamfered surface of the retaining ring.

In a preferred form, the first valve component may be a bonnet.

In a preferred form, the second valve component may be a cage axially aligned with the bonnet.

In a preferred form, the chamfered surface may be angled such that an outer diameter of the retaining ring decreases in an axial direction towards at least one of the first and second parallel sides.

In a preferred form, the retaining ring may compress when the retaining ring is engaged with the portion of the first valve component as the first valve component couples to the second valve component.

In a preferred form, the chamfered surface of the retaining ring may have an angle relative to the first and second parallel surfaces of the retaining ring in a range of approximately 30 degrees to approximately 60 degrees.

In a preferred form, an inner diameter of the first valve component may be greater than the outer diameter of the second valve component.

In a preferred form, an outer diameter of the retaining ring may be greater than the outer diameter of the second valve component and the inner diameter of the first valve component.

In a preferred form, forming the cavity may include depositing a solidifiable material in consecutive layers to form an angled surface of the cavity that is substantially parallel to the angled surface of the exterior side.

In a preferred from, the method may include forming a channel extending from the cavity through at least one of the interior side, exterior side, first parallel side, and second parallel side of the retaining ring.

BRIEF DESCRIPTION OF THE DRAWINGS

FIG. 5 is a cross-sectional view of the retaining ring of FIG. 1 taken at A-A of FIG. 4;

FIG. 6 is a cross-sectional view of a second exemplary retaining ring assembled in accordance with the teachings of the present disclosure;

DETAILED DESCRIPTION

Figure 1:
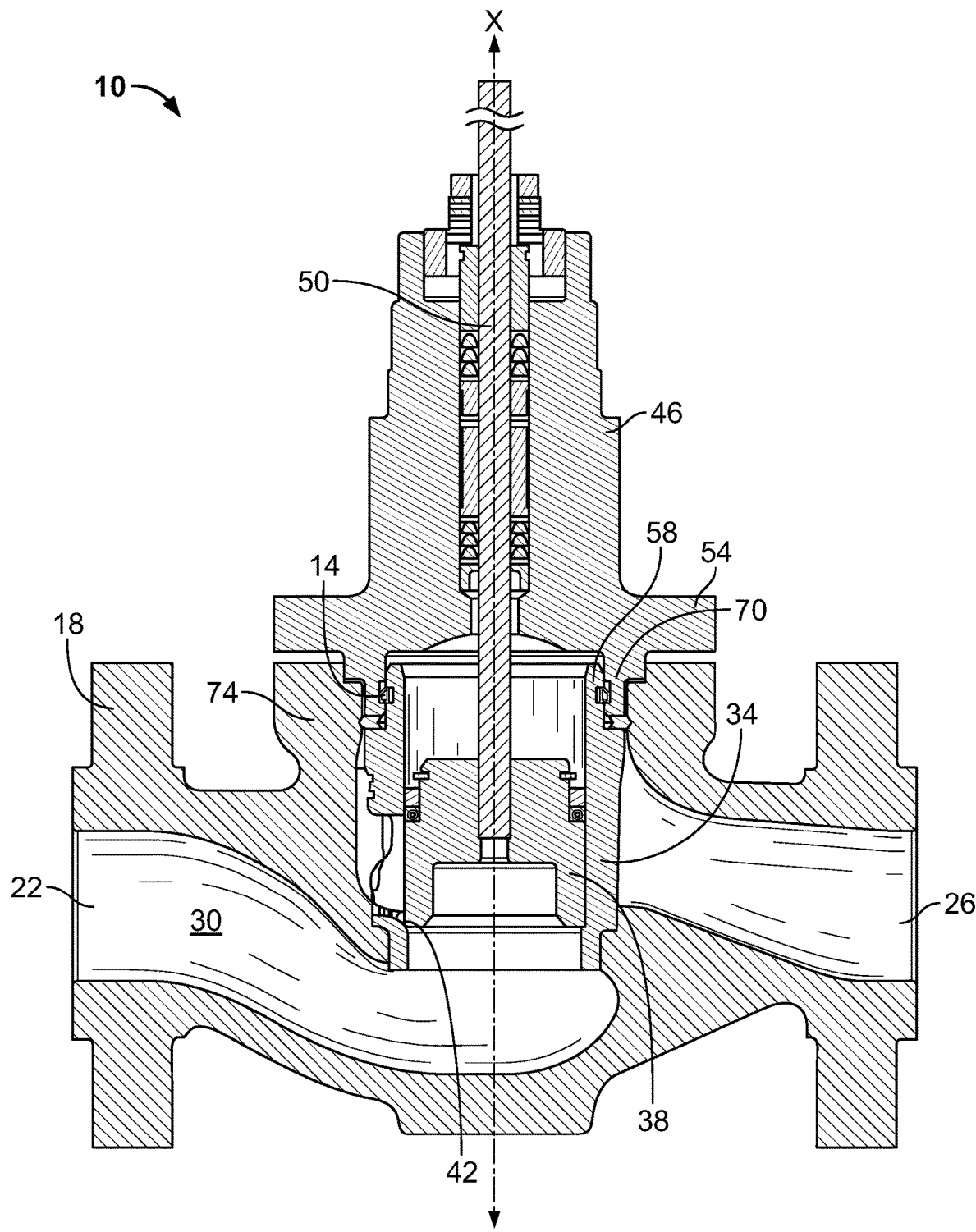
FIG. 1 includes a flow control device assembled in accordance with the teachings of the present disclosure.

In FIG. 1, a flow control device 10 is illustrated and assembled with a first exemplary retaining ring 14 in accordance with the teachings of the present disclosure. The flow control device 10 is a globe valve and includes a valve body 18 having an inlet 26, an outlet 22, and a flow path 30 connecting the inlet 26 and the outlet 22. A cage 34 is disposed in the flow path 30 and helps guide a control element 38 between an open position, in which the control element 38 is spaced away from a valve seat 42, and a closed position, in which the control element 38 engages the valve seat 42 as shown in FIG. 1. A bonnet 46 connects the valve body 18 to an actuator (not shown) and may help guide a valve stem 50 connected to the control element 38. The by A lower portion, which is a bolted flange 54, of the bonnet 46 is coupled to the valve body 18 with studs. The lower portion 54 of the bonnet 46 overlaps with an upper end 58 of the cage 34 (according to the orientation illustrated in FIG. 1) so that the bonnet 46 and cage 34 are aligned relative to a longitudinal axis X. The first exemplary retaining ring 14 is disposed between the cage 34 and the bonnet 46 and includes an interior cavity 62, as shown in more detail in FIGS. 2 and 3.

Figure 2:
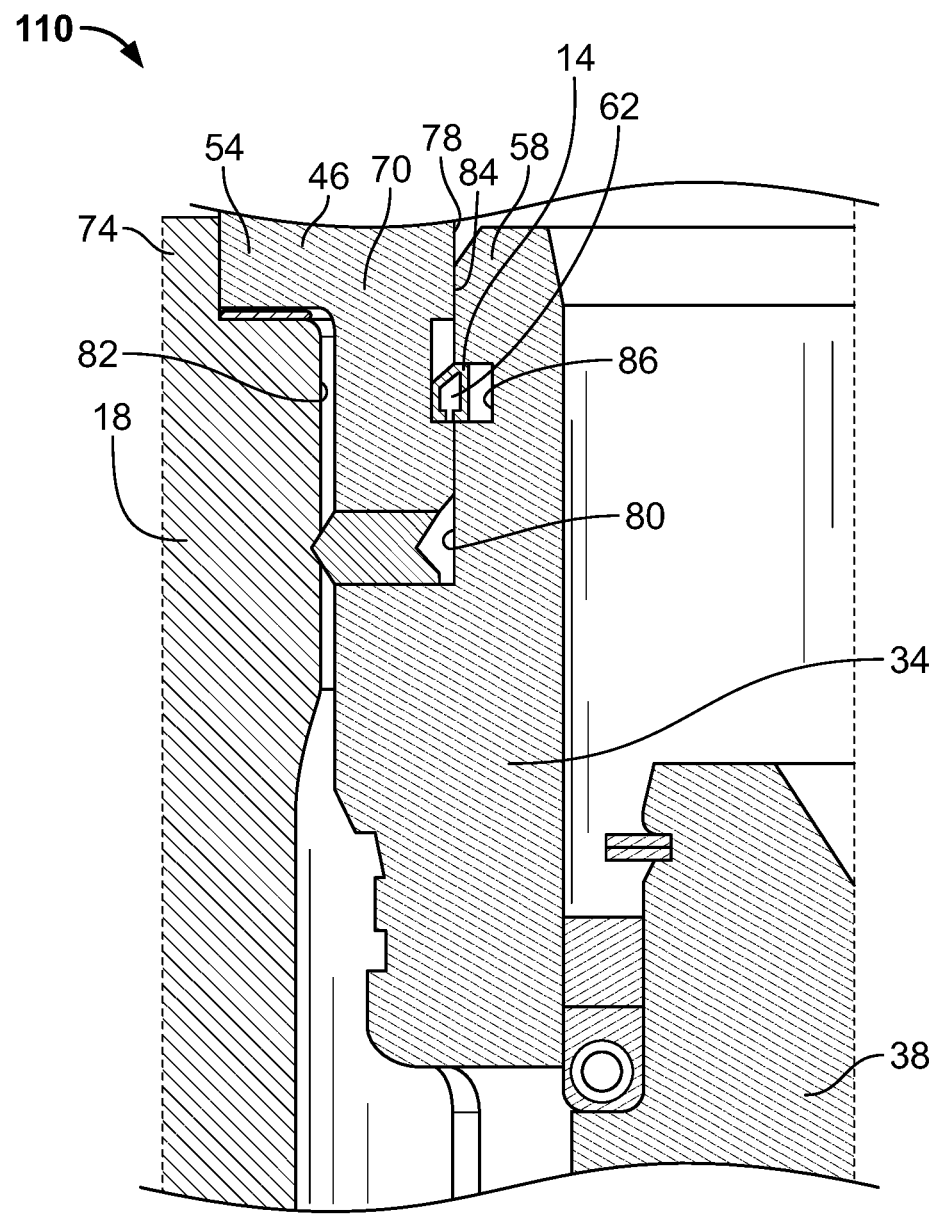
FIG. 2 is a magnified, partial view of a bonnet, cage, and a first exemplary retaining ring of the flow control device of FIG. 1.
Figure 3:
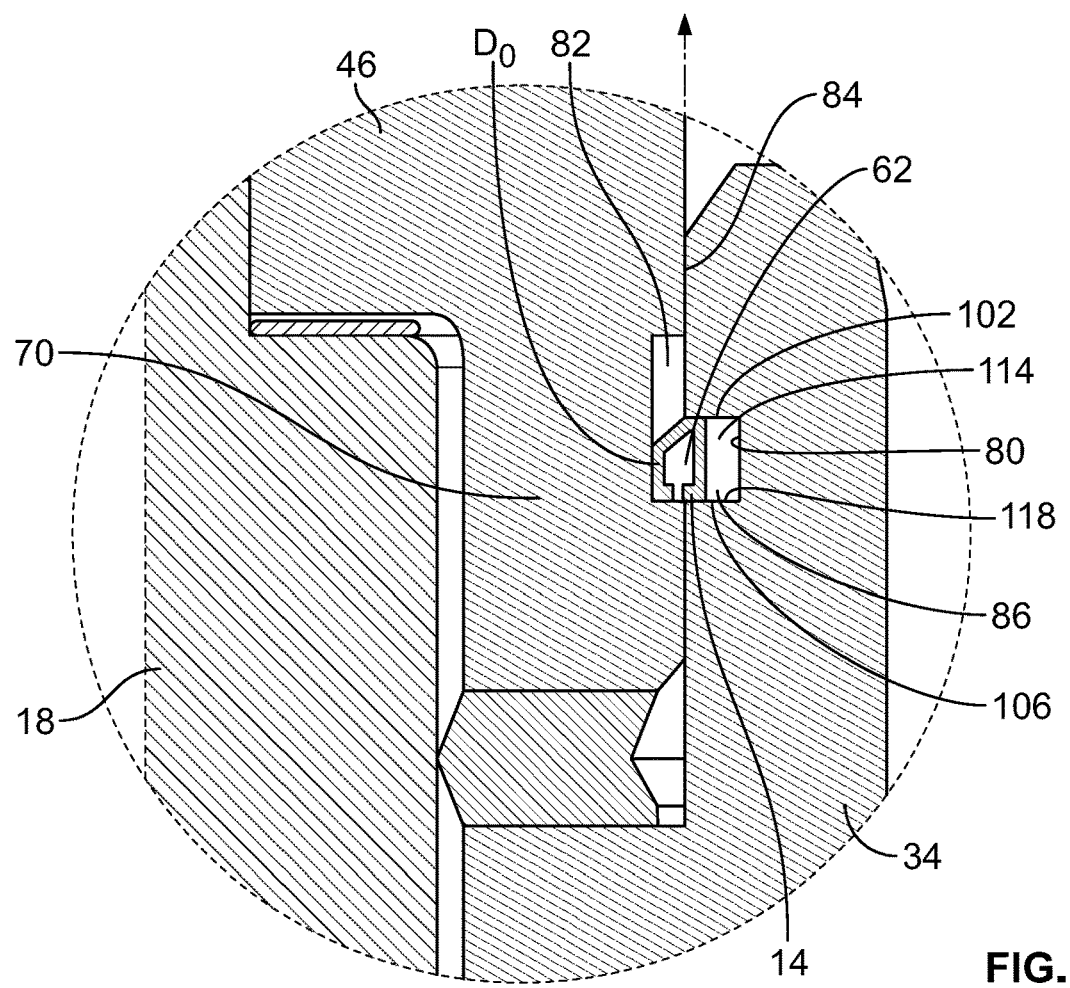
FIG. 3 is a magnified, partial view of the bonnet, cage, and retaining ring of FIG. 2.

Turning to FIGS. 2 and 3, the retaining ring 14 and overlapping portions 58, 70 of the cage 34 and bonnet 46, respectively, are illustrated in more detail. The overlapping portion 70 of the bonnet 46 is a stepped, annular projection 70 extending from the lower portion 54 of the bonnet 46. The stepped annular projection 70 mates with a corresponding stepped portion 74 of the valve body 18 and surrounds the recessed upper end 58 of the cage 34. The bonnet 46 overlaps with the cage 34 such that an interior surface 78 of the bonnet 46 engages an outer surface 80 of the recessed upper end 58 of the cage 34 at a mating interface 84. A gap is formed in the mating interface 84 where an interior groove 82 is formed in the interior surface 78 of the bonnet 46 and an outer groove 86 is formed in the exterior surface 80 of the cage 34. When the cage 34 is coupled to the bonnet 46, the outer groove 86 of the cage 34 is adjacent to the interior groove 82 of the bonnet 46 and the retaining ring 14 is disposed between, and extends into, the adjacent grooves 82, 86.

Additionally, a gasket or seal 88 is disposed between the bonnet 46, the cage 34, and the valve body 18. Specifically, the seal 88 is clamped between the annular projection 70 of the bonnet 46 and a stepped portion 71 of the cage 34. In this configuration, the seal 88 may sealingly engage the cage 34 and the bonnet 46 regardless of the relative position between the cage 34 and the bonnet 46. The clamped seal 88 is disposed below (in the orientation of FIGS. 1-3) and radially outward relative to the retaining ring 14. In the illustrated example, the seal 88 is a spiral-wound gasket. However, in other examples, the seal 88 may be different type of seal. Further, a seal 91 is positioned between a shoulder of the stepped portion 70 of the bonnet 46 and a surface of the stepped portion 74 of the valve body 18. While the seal 91 is shown as a shim gasket or a bonnet gasket, other types of seals may be used.

The retaining ring 14 of the present disclosure is configured to assemble with existing and fixed envelope dimensions of the cage 34 and the bonnet 46. In particular, the annular projection 70 of the bonnet 46 includes a beveled edge 89 that has a fixed dimension to ensure proper sealing between the seal 88 and the cage 34. If the bevel 89 were larger to better receive a retaining ring, the sealing area of the seal 88 would be compromised and may cause leaks in the valve assembly. The retaining ring 14 facilitates assembly of existing valve components by including a lead-in chamfered edge 110. During assembly, the chamfered edge 110 of the retaining ring 14 is aligned with the bevel 89 formed in the annular portion of the bonnet 46.

As shown in FIGS. 2-5, the retaining ring 14 is a semicircular component that includes a gap 90 to allow the ring 14 to compress and expand to fit into the grooves 82, 86 of the bonnet 46 and cage 34 during assembly of the flow control device 10. The retaining ring 14 includes an interior side 94, an exterior side 98, and first and second parallel sides 102, 106 that connect to, and extend between, the interior and exterior sides 94, 98. A portion 110 of the exterior side 98 of the retaining ring 14 is angled to create a chamfered lead-in edge. An outer diameter $D_O$ (i.e., the diameter of the ring 14 in its expanded position shown in FIG. 4) of the ring 14 at least partly decreases in an axial direction (i.e., upwards in the orientation of FIG. 5) to meet the first parallel side 102 to form the angled surface 110. The angled surface 110 of the exterior side 98 of the ring 14 provides a chamfered lead-in edge to facilitate assembly of the bonnet 46 with the cage 34. To effectively retain the bonnet 46, the outermost diameter $D_O$ of the retaining ring 14 is greater than an inner diameter of the bonnet 46. As such, during assembly, the bonnet 46 engages the angled surface 110 of the retaining ring 14 to compress the retaining ring 14 until the ring 14 expands and snaps into the interior groove 82 of the bonnet 46.

As shown in FIGS. 2 and 3, the angled surface 110 is oriented outwardly and faces the bonnet 46. The angled surface 110 of the exterior side 98 is partially disposed in both the groove 82 of the bonnet 46 and the groove 86 of the cage 34 such that a midpoint $M_C$ of the cavity 62 aligns with the mating interface 84 of the cage 34 and the bonnet 46. The midpoint $M_C$ of the cavity 62 is aligned with a point on the sloped surface 110 known as the shear diameter $D_S$ of the retaining ring 14 (as shown in FIG. 5) where the ring 14 breaks due to shearing forces during disassembly. However, in other examples, the angled surface 110 may entirely extend into the groove 82 of the bonnet 46 such that the midpoint $M_C$ of the cavity 62 does not align with the mating interface 84.

FIG. 3 illustrates the first and second parallel sides 102, 106 of the ring 14 engaging with first and second parallel surfaces 114, 118 of the outer groove 86 of the cage 34. In this configuration, the retaining ring 14 is securely coupled to the groove 86 of the cage 34 by an interference fit. The interior side 94 of the ring 14, however, is spaced from an interior surface 119 of the outer groove 86 of the cage 34 to permit radial movement of the retaining ring 14 relative to the cage 34. Specifically, the space between the interior side 94 of the retaining ring 14 and the interior surface 119 of the outer groove 86 provides ample space for the retaining ring 14 to extend further into the groove 86 when the ring 14 is compressed during assembly of the bonnet 46 to the cage 34. In other examples, one of the first and second parallel sides 102, 106 of the ring 14 may be spaced away from the parallel surfaces 114, 118 of the outer groove 86 to provide clearance between the ring 14 and the cage 34.

Figure 4:
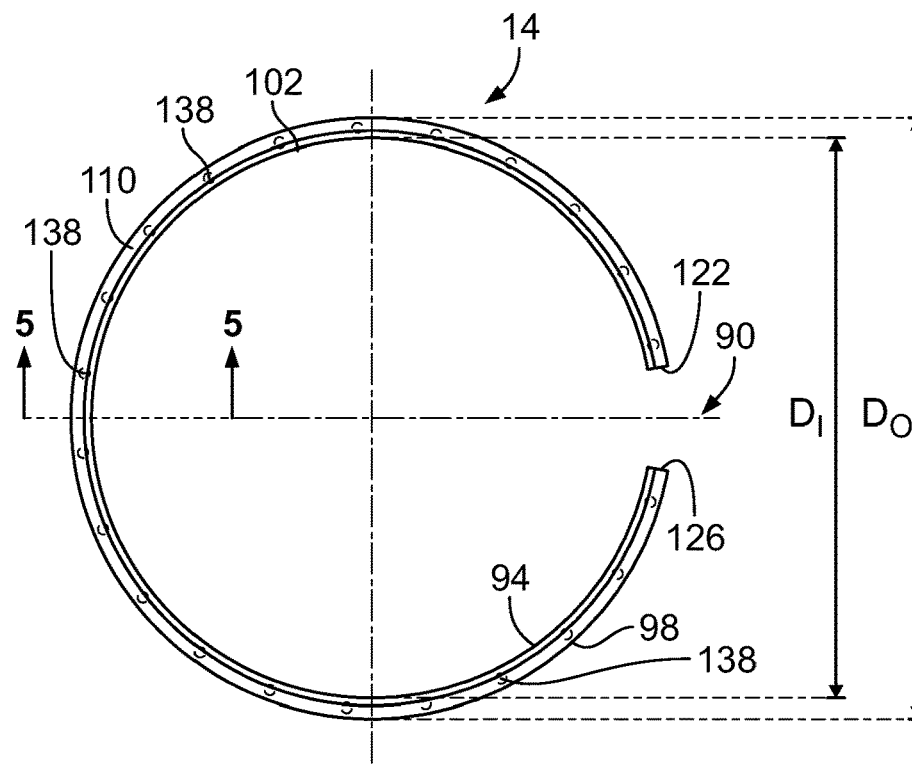
FIG. 4 is a top view of the retaining ring of FIG. 1.

As illustrated in FIG. 4, the retaining ring 14 includes the outer diameter $D_O$, an inner diameter $D_I$, and a gap 90 between first and second ends 122, 126 of the ring 14. To retain the bonnet 46 to the cage 34, the outer diameter $D_O$ of a straight portion 130 of the exterior side 108 of the retaining ring 14 is greater than an outer diameter of the cage 34 and an inner diameter of the bonnet 46. The inner diameter $D_I$ of the ring 14 is less than the outer diameter of the cage 34 such that the ring 14 securely couples to the groove 86 of the cage 34 by a snap fit connection. As previously mentioned, the gap 90 of the retaining ring 14 permits the ring 14 to compress and expand, thereby moving the first and second ends 122, 126 relative to each other so that the retaining ring 14 can couple to the cage 34 and retain the bonnet 46 to the cage 34. The retaining ring 14 may be, for example, a snap-ring that snaps into the grooves 82, 86 of the bonnet 46 and the cage 34 to secure the bonnet 46 to the cage 34. In some examples, the retaining ring 14 may be a single or multiple would ring, stamped ring, beveled ring, and may include additional features to facilitate gripping with snap ring pliers. The retaining ring 14 is made of ferrous or non-ferrous metals. For example, the retaining ring 14 may be a 300 series stainless steel.

Turning now to FIG. 5, a cross-pentagonal cross-sectional shape of the ring 14 is defined by the exterior side 98 having the straight portion 130 and the angled surface 110, the interior side 94, which is parallel to the straight portion 130 of the exterior side 98, and first and second parallel surfaces 102, 106 that extend between the interior and exteriors sides 94, 98. The angled surface 110 of the exterior side 98 extends from the outermost diameter $D_O$ of the retaining ring 14 (i.e., the straight portion 130) to the first parallel surface 102. The angled surface 110 is sloped at an angle α in a range of approximately 30 degrees to approximately 60 degrees, and preferably 45 degrees, relative to the first parallel surface 102.

The cross-section of the retaining ring 14 of FIG. 5 also illustrates the cavity 62, which is disposed between the interior and exterior sides 94, 98 of the ring 14 and has an angled surface 134 that is substantially parallel to the angled surface 110 of the exterior side 98. Unlike the cross-sectional shape of the retaining ring 14, the cavity 62 has a trapezoidal cross-sectional shape. The midpoint $M_C$ of the angled surface 134 of the cavity 62 is arranged to align with the mating interface 84 when the ring 14 is disposed between the cage 34 and the bonnet 46. This midpoint $M_C$ aligns with the shear diameter $D_S$ of the ring 14, which is the point at which the retaining ring 14 shears (i.e., breaks upon opposing shear forces) when the bonnet 46 is decoupled from the cage 34. For example, when the bonnet 46 is pulled upward (in the orientation of FIG. 1) and away from the cage 34, opposing shear forces act upon the retaining ring 14, causing the retaining ring 14 to break at the shear diameter $D_S$. Compared to solid retaining rings, the hollow retaining ring 14 of the present disclosure requires less shear force to break and therefore facilitates disassembly of the flow control device 10 of FIG. 1.

As described further below, the retaining ring may be manufactured using additive manufacturing (AM) techniques. To facilitate the AM process, a blind hole or channel 138 is formed in the retaining ring 14 and extends from the cavity 62 and through at least one of the sides 94, 98, 102, 106 of the retaining ring 14. In the illustrated example, the channel 138 connects the cavity 62 with the second parallel side 106 The blind hole 138 has a diameter $D_C$ that is smaller than a width $W_C$ of the cavity 62, and is formed to allow debris and dust created during manufacturing to fall out of the cavity 62 of the ring 14. In this example, the ring 14 has a plurality of blind holes 138 spaced around the circumference of the ring 14.

In the illustrated example, the sloped surface 110 of the retaining ring 14 and the sloped surface 134 of the cavity 62 are oriented outward facing the bonnet 46 so that a portion of the bonnet 46 slides against and engages the sloped surface 110 of the ring 14 during assembly. However, in another example, the sloped surface 110 of the retaining ring 14 may be oriented inward (i.e., extending to the second parallel side 106), or the interior side 94 of the ring 14 may have a chamfered edge, depending on the assembly and orientation of the bonnet 46 and the cage 34. Additionally, in another example, the cavity 62 may be shaped differently and may be pentagonal to match the cross-sectional shape of the ring 14, or the cavity 62 may be completely different such as round, triangular, or otherwise polygonal. Further, the cavity 62 may vary in structure throughout the circumference of the ring 14. For example, the cavity 62 may include lattice elements to provide interior structure to the cavity 62, or the cavity 62 may be larger in some areas of the ring 14 and smaller in other areas. In yet another example, the retaining ring 14 may be manufactured without an internal cavity 62 or without an angled lead-in edge 110.

For example, FIG. 6 illustrates a second exemplary retaining ring 214 that may be used to retain the cage 34 and bonnet 46 of the flow control device 10 of FIG. 1. The retaining ring 214 of FIG. 6 is similar to the retaining ring 14 of FIGS. 1-5 described above, with similar reference numerals (increased by 200) used for similar components but has a different cross-sectional shape and cavity 262. Like the first exemplary retaining ring 14, the second exemplary retaining ring 214 includes an interior cavity 262 with a decreased shear area (compared to solid retaining rings). As such, a reduced shear force is required to break the retaining ring 214 to disassemble the cage 34 from the bonnet 46. The second exemplary retaining ring 214 also differs in the cross-sectional shape of the interior cavity 262. In this example, the interior cavity 262 is rectangular and matches the rectangular cross-sectional shape of the retaining ring 214. In this example, the retaining ring 214 does not have a lead-in chamfered edge but is flexible to facilitate assembly.

The retaining ring 214 is illustrated with a sensor 250, e.g., ultrasonic transducer, laser displacement sensor, vibration sensor, etc., disposed in the interior cavity 262. The sensor 250 may be embedded or installed in or on an interior wall 252 (e.g., in between interior and exterior sides 294, 298 of the ring 214) of the cavity 262. Specifically, in the illustrated example, the sensor 250 is placed adjacent to the interior wall 252 of the cavity 262 and may be attached to the ring 214 during manufacture. The sensor 250 may measure process conditions, component wear, leaks, or may take other diagnostics of the flow control device 10. The sensor 250 may be coupled to a digital valve controller to automate monitoring of the flow control device 10. In one example, the retaining ring 214 may include a plurality of sensors 250 spaced along the circumference of the ring 214.

Figure 7:
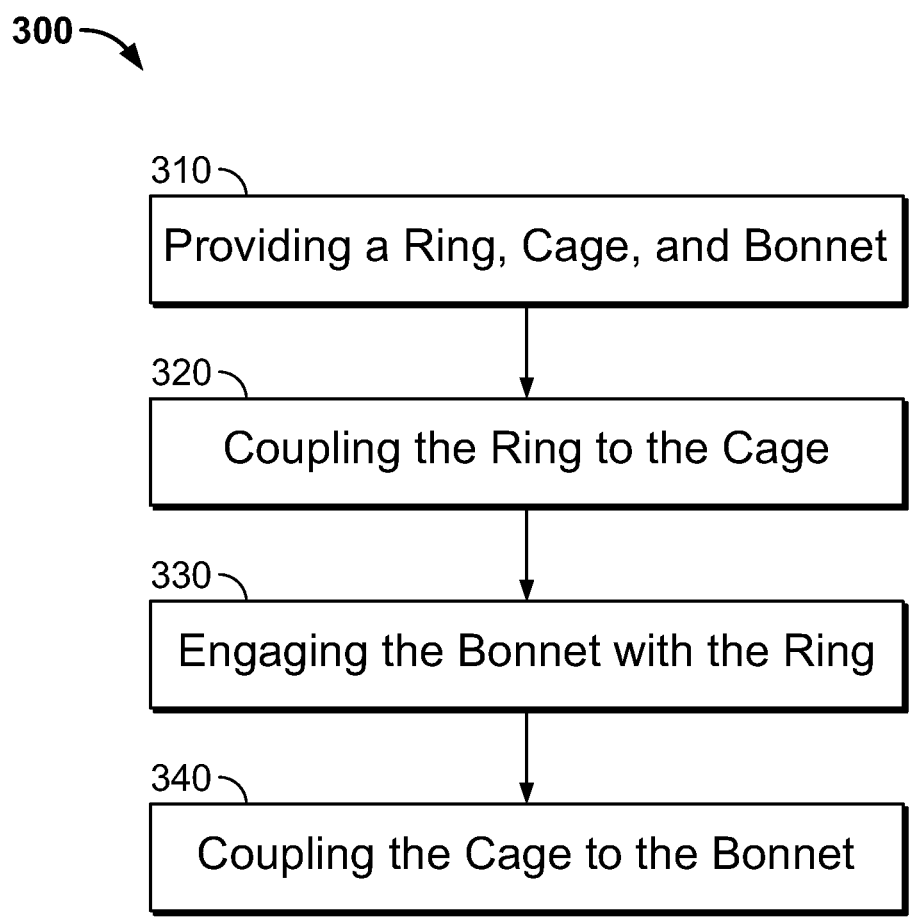
FIG. 7 is a schematic diagram of a method of assembling a bonnet, cage, and retaining ring in accordance with the teachings of the present disclosure.

An exemplary method 300 of retaining the bonnet 46 to the valve cage 34 is depicted in the schematic diagram of FIG. 7 and is described with reference to the first exemplary retaining ring 14 of FIGS. 1-5. In a first step 310, the retaining ring 14, cage 34, and bonnet 46 of the flow control device 10 is provided. However, in another exemplary method, the retaining ring 14 may be used to retain different valve components. To assemble the bonnet 46 of the valve control device 10, and in particular, to retain the bonnet 46 to the cage 34, the retaining ring 14 is first securely coupled to the outer groove 86 of the cage 34 in step 320. In step 330, the annular projection 70 of the bottom section 54 of the bonnet 46 engages the ring 14 to compress the ring 14 radially inward and further into the outer groove 86 of the cage 34. When assembling the first exemplary retaining ring 14 of this particular example, the annular projection 70 slides against the lead-in angled surface 110 to facilitate assembly of the bonnet 46 to the valve body 18. Once the groove 82 of the bonnet 46 aligns with the groove 86 of the cage 34, the ring 14 expands or snaps into the inner groove 82 of the bonnet 46, as shown in FIGS. 1-3, to couple the cage 34 to the bonnet 46 in step 340.

Figure 8:
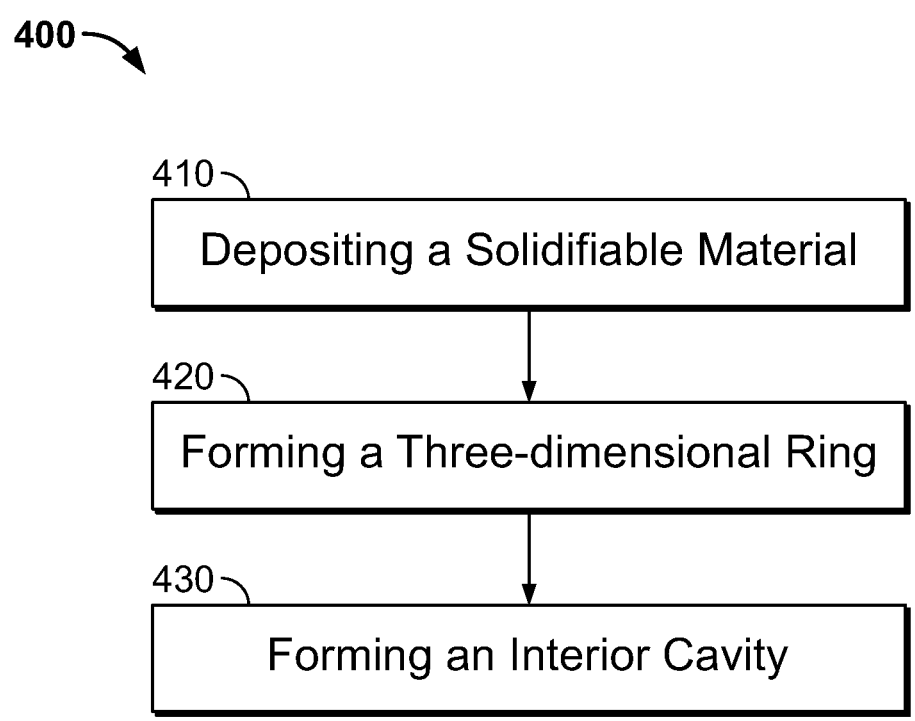
FIG. 8 is a schematic diagram of a method of manufacturing a retaining ring in accordance with the teachings of the present disclosure.

Turning now to FIG. 8, an exemplary method 400 of manufacturing a retaining ring 14, 214 is depicted in the schematic diagram and is described with reference to the first exemplary retaining ring 14 of FIGS. 1-5. The method 400 includes a first step 410 of depositing a solidifiable material on a working surface. As a result of depositing consecutive layers of the solidifiable material, a three-dimensional retaining ring 14 is formed in step 320 in which the ring 14 includes interior and exterior sides 94, 98 and first and second parallel sides 102, 106. In step 430, an interior cavity 62 of the retaining ring 14 is formed. In one example, the interior cavity 62 is formed simultaneously with the formation of the three-dimensional retaining ring 14. However, in other examples, the cavity 62 may be formed after the body of the retaining ring 14 is formed. The step 430 of forming the cavity 62 includes depositing a solidifiable material in consecutive layers to form an interior cavity 62 surrounded by the sides 94, 98, 102, 106 of the retaining ring body 14. The step 430 includes forming an angled surface 134 of the cavity 62 that is substantially parallel with the angled surface 110 of the ring 14.

Finally, the exterior side 98 of the retaining ring 14 is formed with a chamfered edge 110 such that the outer diameter $D_O$ of the retaining ring 14 decreases in an axial direction to at least one of the first and second parallel sides 102, 106. In one example, the angled surface 110 of the ring 14 is formed simultaneously with step 420. However, in other examples, the angled surface 110 may be formed after the body of the ring 14 is formed in step 420.

The method 400 also includes forming a plurality of blind holes or channels 138 that connect the cavity 62 with the second parallel side 106 of the retaining ring 14. The channels 138 may be formed simultaneously with the first and second steps 410, 420 of the method 400, or the channels 138 may be formed after the first and second steps 410, 420. As previously mentioned, the channels 138 are formed to allow debris and dust created during the additive manufacturing process to fall out of the cavity 62 of the ring 14. In this example, the ring 14 has a plurality of channels 138 spaced around the circumference of the ring 14.

The retaining ring 14 of the present disclosure may be manufactured with additive manufacturing (AM) techniques, investment casting, wire electrical discharge machining, or a combination of techniques. However, additive manufacturing may allow for greater precision of the interior cavities 62, 262 of the disclosed retaining rings 14, 214 to create smaller shear areas to facilitate breaking.

More specifically, to form the retaining ring 14, 214 of the present disclosure, the steps of method 400 of FIG. 8 utilizes an AM technique or process that builds three-dimensional objects by adding successive layers of material on a receiving surface or material. The AM technique may be performed by any suitable machine or combination of machines. The AM technique may typically involve or use a computer, three-dimensional modeling software (e.g., Computer Aided Design, or CAD, software), machine equipment, and layering material. Once a CAD model is produced, the machine equipment may read in data from the CAD file and layer or add successive layers of liquid, powder, sheet material (for example) in a layer-upon-layer fashion to fabricate a three-dimensional object. The AM technique may include any of several techniques or processes, such as, for example, a stereolithography ("SLA") process, digital light processing ("DLP"), a fused deposition modeling ("FDM") process, multi-jet modeling ("MJM") process, a selective laser sintering ("SLS") process, a selective laser melting ("SLM") process, powder bed fusion process, an electronic beam melting ("EBM") process, and an arc welding AM process. In some examples, the AM process may include a directed energy laser deposition process. Such a directed energy laser deposition process may be performed by a multi-axis computer-numerically-controlled ("CNC") lathe with directed energy laser deposition capabilities. Other manufacturing techniques may be utilized to create a valve cage according to the present disclosure and are not limited to the listed techniques herein.

The retaining rings 14, 214 and methods of manufacture 400 and assembly 300 disclosed herein may provide a solution to problems associated with assembly and disassembly of bonnet and cage assemblies where the envelope dimensions are fixed. The retaining rings 14, 214 disclosed herein may be customized during manufacturing using AM techniques to provide a retaining ring 14, 214 with a reduced shear area by forming an interior cavity 62, 262, and therefore reduced material, as compared to traditional retaining rings. Traditionally, when working with fixed envelope dimensions, a retaining ring may be made with a reduced ring height or an increase ring gap to reduce shear area of the ring. However, traditional retaining rings like these would cause undesirable clearance and misalignment between the valve components. Thus, the retaining rings 14, 214 of the present disclosure do not compromise height or ring gap to reduce shear area, and therefore maintain alignment and stability between the valve components. In fact, the retaining rings 14, 214 are manufactured according to fixed envelope dimensions to closely fit into the inner and outer grooves 82, 86 of the bonnet 46 and the cage 34 of the flow control device 10.

The retaining ring 14 of the present disclosure adapts to existing and fixed envelope dimensions of the valve components 34, 46 by including a lead-in chamfered edge 110. Typically, one or more valve components may have an angled surface that assists with assembly when mating with a different valve component. However, when a lead-in angled surface is either impractical or impossible for a valve component such as, for example a bonnet, retaining the bonnet to the cage using a retaining ring may be difficult. To address this issue, the lead-in chamfered edge 110 of the first exemplary retaining ring 14 assists in coupling the bonnet 46 to the cage 35 when the bonnet 46 does not have a traditional lead-in surface, and providing one to the bonnet 46 would be expensive and/or cause sealing issues with the cage 34.

As discussed above, the retaining rings 14, 214 of the present disclosure reduce shear area by forming an interior cavity 62, 262, which may be formed precisely using AM techniques. For example, the angled surface 134 of the cavity 62 of the first exemplary retaining ring 14 may be manufactured using, for example, powder bed laser metal sintering, to form the angled surface 134 so that it is parallel with the angled surface 110 of the exterior side 98. The angled surface 134 of the cavity 62 advantageously follows the angled surface 110 to compensate for any misalignment between the ring 14 and the bonnet 46. In this way, the interior cavity 62 ensures that the shear area is identical between small variations in shear diameter (i.e., when there is some misalignment with the mating interface 34 and the midpoint $M_C$ of the cavity 62). In other examples, additive manufacturing may permit utilization of sensor technology within the retaining ring 14, 214. As shown in the second exemplary retaining ring 214, a sensor 250 may be disposed within the interior cavity 262 for measuring valve process conditions and diagnostics. The sensor 250 may be placed in the cavity 262 or embedded in one of the sides of the retaining ring 214 during manufacture using AM techniques. While not expressly illustrated, the first exemplary retainer 14 previously described may also be paired with one or more sensors, e.g., ultrasonic transducer, laser displacement sensor, vibration sensor, etc., to take measurements of process conditions or other diagnostics within the flow control valve 10.

While the retaining rings 14, 214 are described in conjunction with a cage 34 and a bonnet 46 of the flow control device 10 of FIG. 1, the retaining rings 14, 214 may be custom manufactured to retain different valve components for use with a different control valve assembly. For example, the retaining ring 14, 214 may be used to retain two valve components where at least one of the valve components is neither a cage nor a bonnet. For example, the retaining ring 14, 214 may be used to retain two completely different valve components.

The figures and description provided herein depict and describe a preferred embodiment of a retaining ring for purposes of illustration only. One skilled in the art will readily recognize from the foregoing discussion that alternative embodiments of the components illustrated herein may be employed without departing from the principles described herein. Thus, upon reading this disclosure, those of skill in the art will appreciate still additional alternative structural and functional designs for retaining rings. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the methods and components disclosed herein without departing from the spirit and scope defined in the appended claims.

What is claimed:

1. A flow control device comprising:
    a valve body having an inlet, an outlet, and a flow path connecting the inlet and the outlet;
    a cage disposed in the flow path;
    a bonnet coupled to the cage and including a portion overlapping with a portion of the cage;
    a retaining ring disposed between the cage and the bonnet, the retaining ring including an interior side, an exterior side, and a cavity formed between the interior and exterior sides.

2. The flow control device of claim 1, wherein the exterior side of the retaining ring has an angled surface that at least partially extends into an interior groove of the bonnet.

3. The flow control device of claim 2, wherein a cross-section of the cavity has an angled side, the angled side substantially parallel with the angled surface of the exterior side of the retaining ring.

4. The flow control device of claim 1, wherein the bonnet includes an interior groove and the cage includes an exterior groove, the retaining ring disposed between the interior groove and the exterior groove.

5. The flow control device of claim 4, wherein the retaining ring includes first and second parallel sides extending between the interior and exterior sides, the first and second parallel sides mating with first and second parallel surfaces of the exterior groove of the cage.

6. The flow control device of claim 1, wherein the cavity has a trapezoidal cross-sectional area.

7. The flow control device of claim 1, wherein a portion of the exterior side of the retaining ring is parallel with a portion of the interior side of the retaining ring.

8. The flow control device of claim 1, further comprising a sensor disposed in the cavity of the retaining ring.

9. A retaining ring assembly, the assembly comprising:
    a first valve component with an annular projection, the annular projection having an interior surface and a groove formed in the interior surface;
    a second valve component having a cylindrical wall with an exterior surface and a groove formed in the exterior surface, the cylindrical wall of the second valve component overlapping with the annular projection of the first valve component when the first and second valve components are coupled;
    a retaining ring disposed between the groove of the first valve component and the groove of the second valve component, the retaining ring including an interior side, an exterior side, first and second parallel sides extending between the interior and exterior sides, and a cavity disposed between the first and second parallel sides and between the interior and exterior sides.

10. The retaining ring assembly of claim 9, wherein the exterior side of the retaining ring has a chamfered surface that is adapted to engage a portion of the first valve component when the second valve component overlaps with the first valve component to couple the first and second valve components.

11. The retaining ring assembly of claim 10, wherein the cavity includes an angled surface substantially parallel to the chamfered surface of the retaining ring.

12. The retaining ring assembly of claim 10, wherein the first valve component is a bonnet, and the second valve component is a cage axially aligned with the bonnet.

13. The retaining ring assembly of claim 10, wherein the chamfered surface is angled such that an outer diameter of the retaining ring decreases in an axial direction towards at least one of the first and second parallel sides of the retaining ring.

14. The retaining ring assembly of claim 9, wherein the retaining ring compresses when engaged with the portion of the first valve component as the first valve component couples to the second valve component.

15. The retaining ring assembly of claim 9, wherein the chamfered surface has an angle relative to the first and second parallel surfaces of the retaining ring in a range of approximately 30 degrees to 60 degrees.

16. The retaining ring assembly of claim 9, wherein an inner diameter of the first valve component is greater than an outer diameter of the second valve component, and an outer diameter of the retaining ring is greater than the outer diameter of the second valve component and the inner diameter of the first valve component.

17. A method of manufacturing a retaining ring using additive manufacturing, the method comprising:
    forming a retaining ring having an interior side, exterior side defining an outer diameter, and first and second parallel sides extending between the interior and exterior sides, the exterior side including an angled surface such that the outer diameter of the retaining ring decreases in an axial direction to at least one of the first and second parallel sides;
    forming a cavity disposed between the interior side, exterior side, and the first and second parallel sides; and
    wherein forming the ring includes depositing a solidifiable material in multiple layers to form a three-dimensional retaining ring with an interior cavity.

18. The method of claim 17, wherein forming the cavity includes depositing a solidifiable material in consecutive layers to form an angled surface of the cavity that is substantially parallel to the angled surface of the exterior side.

19. The method of claim 17, further comprising forming a channel extending from the cavity through at least one of the interior side, exterior side, first parallel side, and second parallel side.

20. A method of retaining a bonnet to a valve cage using a retaining ring, the method comprising:
    providing a retaining ring having an interior side defining an inner diameter, exterior side defining an outer diameter, and first and second parallel sides extending between the interior and exterior sides, the exterior side including an angled surface such that the outer diameter of the retaining ring decreases in an axial direction to at least one of the first and second parallel sides;
    providing a cage having an outer wall and a groove formed in the outer wall;
    providing a bonnet having an annular portion with an interior surface and a groove formed in the interior surface of the annular portion;
    coupling the retaining ring to the groove of the cage;
    coupling the cage to the bonnet by engaging the end of the annular portion of the bonnet with the angled surface of the retaining ring, thereby compressing the retaining ring further into the groove of the cage until the groove of the bonnet is adjacent to the groove of the cage.

* * * * *

UNITED STATES PATENT AND TRADEMARK OFFICE
CERTIFICATE OF CORRECTION

PATENT NO. : 11,339,891 B2
APPLICATION NO. : 16/901898
DATED : May 24, 2022
INVENTOR(S) : Lucas J. Schmitt et al.

It is certified that error appears in the above-identified patent and that said Letters Patent is hereby corrected as shown below:

In the Specification

At Column 3, Line 48, "from," should be -- form, --.

At Column 4, Lines 23-24, "The by A" should be -- The --.

At Column 6, Line 65, "106 The" should be -- 106. The --.

At Column 9, Line 33, "increase" should be -- increased --.

Signed and Sealed this
Fifth Day of September, 2023

Katherine Kelly Vidal
*Director of the United States Patent and Trademark Office*